United States Patent
Dillard et al.

(10) Patent No.: US 8,454,158 B2
(45) Date of Patent: Jun. 4, 2013

(54) DEVICE FOR COUPLING A WIRELESS HEADSET TO AN EYEGLASS FRAME

(76) Inventors: Glenn Joseph Dillard, Los Angeles, CA (US); Belinda Faye Baker, Los Angeles, CA (US)

( * ) Notice: Subject to any disclaimer, the term of this patent is extended or adjusted under 35 U.S.C. 154(b) by 0 days.

(21) Appl. No.: 13/205,991

(22) Filed: Aug. 9, 2011

(65) Prior Publication Data

US 2013/0038831 A1   Feb. 14, 2013

(51) Int. Cl.
*G02C 1/00* (2006.01)
(52) U.S. Cl.
USPC .......................................... 351/158; 351/123
(58) Field of Classification Search
USPC . 351/123, 121, 122, 111, 158, 41; 445/569.1, 445/575.2; 381/381, 366
See application file for complete search history.

(56) References Cited

U.S. PATENT DOCUMENTS

| 4,901,355 | A | * | 2/1990 | Moore | 381/381 |
| 5,335,285 | A | * | 8/1994 | Gluz | 381/381 |
| 5,465,466 | A | * | 11/1995 | Napier | 24/3.3 |
| 5,673,432 | A | * | 10/1997 | Kitayama | 2/15 |
| 7,409,234 | B2 | * | 8/2008 | Glezerman | 455/569.1 |
| 8,011,783 | B1 | * | 9/2011 | LeBlang | 351/158 |

* cited by examiner

*Primary Examiner* — Hung Dang
(74) *Attorney, Agent, or Firm* — James A. Italia; Italia IP

(57) ABSTRACT

An apparatus to facilitate wearing eyewear and a wireless headset at the same time is disclosed. The apparatus may include a first tubular element that may be configured to be slipped over a temple of the eyewear. The apparatus may also include a second tubular element that may be configured to receive an around the ear securing element coupled with, or included with, the wireless headset.

10 Claims, 3 Drawing Sheets

DEVICE FOR COUPLING A WIRELESS HEADSET TO AN EYEGLASS FRAME

BACKGROUND

In many US states, California for example, it is unlawful to use a cell phone while driving unless the driver is using a so called "hands free" device. Hands free devices include wireless headsets having an ear bud portion with a speaker configured to fit outside the ear canal. The speaker portion and other supporting hardware may be supported and hung over the back of the ear of a user with an ear hook. When a user also wears eyewear such eyeglasses, or sunglasses, or the like and wears the wireless headset at the same time, the combination of the portion of the eyeglass temple that hooks over the ear and the ear hook can be uncomfortable to the user, and may cause pain behind the ear.

Therefore, there is a significant need for an apparatus to enable a user to easily and comfortably wear a wireless headset and eyewear at the same time. There is also a need to enable a user to wear a wireless headset while also wearing eyewear in a way that may keep the headset reliably in place.

SUMMARY

This application discloses an apparatus to facilitate wearing eyewear and a wireless headset at the same time and a process for making a product to facilitate wearing eyewear and a wireless headset at the same time. The apparatus may include a first tubular element that may be configured to be slipped over a temple of the eyewear. The apparatus may also include a second tubular element that may be configured to receive an around the ear securing element coupled with, or included with, the wireless headset.

Embodiments may provide a sleeve, or "glove" that may attach to an eyeglass temple, and may be configured to have an ear hook coupled therewith, or housed, at least partially, therein. Embodiments may be removed with the headset, or may be left coupled with the eyewear while the headset is not present.

In some embodiments the device may be made from a resilient material, for example elastic or elastic type material, or rubber, or rubber like material. In some embodiments the device may be made from a plastic, or plastic type material. In some cases the device may be made from a material having characteristics that may provide traction and/or may provide friction characteristics, such as adhesive friction between it and objects in contact with it. In some cases the material may include rubber, or rubberized threads. In this way the material may be form fitting and may be fitted over objects of a variety of shapes and sizes, and able to fit over a variety of eyeglass temples and temple tips. Making the material from a traction type material, or a material that may include traction type threads, may help to keep the device in place on the eyeglass temples, or the temple tips, and/or may keep the ear hook in place.

Some embodiments may use materials that may be stiff, or semi-stiff, or rigid, or semi-rigid material. For example some embodiments may use leather, or a leather-like material, or vinyl, or vinyl-like material.

Some embodiments may use materials considered breathable, or porous, for example certain synthetic materials such as polyester, or a polyester blend. Some embodiments may use an organic material such as cotton, or wool, or the like.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present apparatus product and process is described with reference to several illustrative embodiments described herein, it should be clear that the present invention should not be limited to such embodiments. Therefore, the description of the embodiments provided herein is illustrative of the present invention and should not limit the scope of the invention. In addition, while the following description references drawings showing particular configurations and proportions, it will be appreciated that the invention may be configured to have other configurations and proportions.

The description may use perspective-based descriptions such as up/down, back/front, and top/bottom. Such descriptions are merely used to facilitate the discussion and are not intended to restrict the application of embodiments of the present invention.

Figure 1:
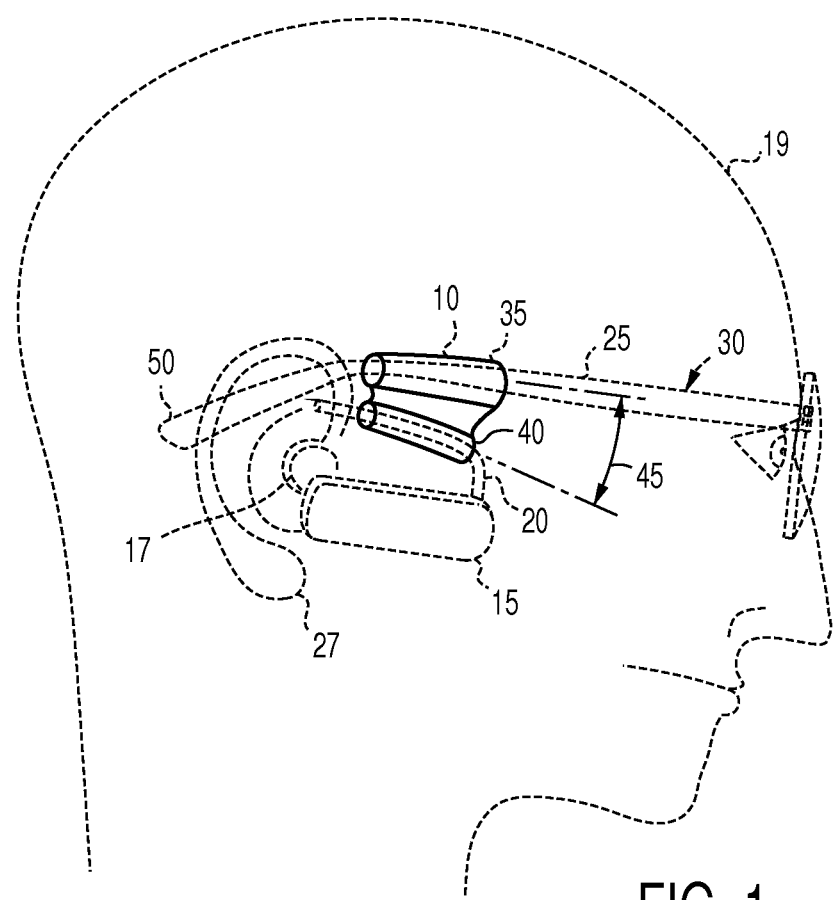
FIG. 1 is a side view illustrating an example apparatus for securing a wireless headset to a temple of a piece of eyewear in accordance with the present disclosure.

FIG. 1 is a side view illustrating an apparatus 10 for securing a wireless headset 15 to a temple piece 25 of eyewear 30 such as a pair of eyeglasses, or sunglasses, or the like. The wireless headset 15 may have an earpiece 17 configured to fit adjacent to, or outside of, the ear canal (not illustrated) of a user 19. The wireless headset 15 may include, or may be coupled with, an around the ear securing element 20. The around the ear securing element 20 may be described herein as an ear hook 20, which may normally be configured to be hooked, or looped over the ear 27 of the user 19. However, as illustrated the ear hook 20 may instead be supported, or held in place by the apparatus in accordance with the present disclosure. The apparatus 10 may include a first tubular element 35 which may be configured to be slipped over the eyewear temple piece 25, and a second tubular element 40 configured to receive the ear bud securing element 20, i.e. ear hook 20.

The embodiment illustrated in FIG. 1 shows the second tubular element 40 arranged at an angle 45 with the first tubular element 35. In some examples the angle 45 may be substantially between, for example, 0 and 30 degrees. In some examples, the angle 45 may be, for example, 20 degrees. In other embodiments, such as the embodiment illustrated, in FIG. 5 discussed more below, the second tubular element 40 may be arranged substantially parallel with the first tubular element 35.

Figure 2:
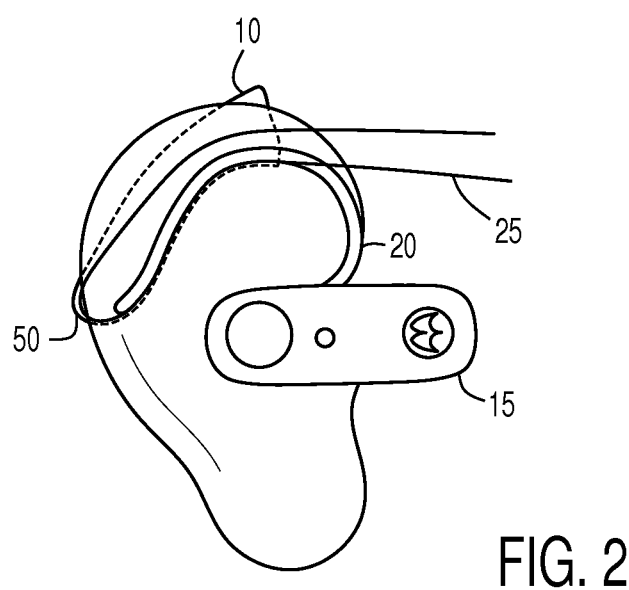
FIG. 2 is a side view illustrating another example apparatus for securing a wireless headset to a temple of a piece of eyewear in accordance with the present disclosure.

FIG. 1 illustrates an example embodiment wherein the wireless handset 15 is supported, and/or positioned, along the length of the eyeglass temple piece 25. FIG. 2 is a side view illustrating another example embodiment wherein the apparatus 10 may be configured to fit near or over an end 50 of the eyeglass temple piece 25, sometimes referred to as the temple tip 50. The apparatus 10 may be made of, or from, a material that may provide a comfortable fit of both the ear hook 20 and the eyewear temple piece 25 behind the user's ear despite a relatively crowded configuration of both pieces being behind the ear 27 of the user 19. Example materials may include cotton, or leather, or the like.

Figure 3:
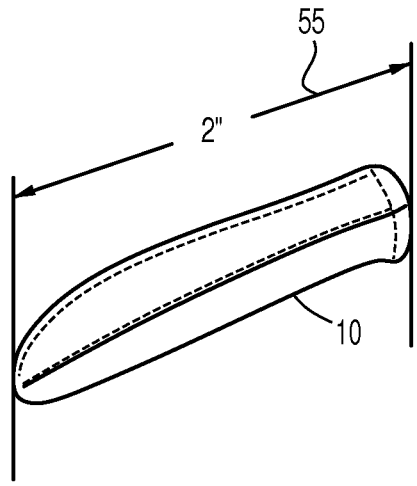
FIG. 3 is a partial side view illustrating an example dimension of an example apparatus for securing a wireless headset to a temple of a piece of eyewear in accordance with the present disclosure.

FIG. 3 is a side view illustrating an example dimension 55 to illustrate a possible size, and example proportions at which various embodiments may be configured. Other embodiments may have other dimensions and may have the same, or other, proportions.

Figure 4:
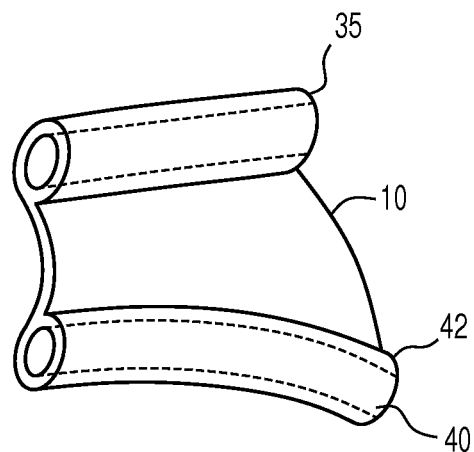
FIG. 4 is a side view illustrating another example apparatus for securing a wireless headset to a temple of a piece of eyewear in accordance with the present disclosure.

FIG. 4 is a side view illustrating another example embodiment. FIG. 4 illustrates an apparatus 10 including a first tubular element 35 and a second tubular element 40 wherein the second tubular element 40 is a curvilinear element 42. The curvilinear element 42 may be configured to receive, for example, a curvilinearly shaped ear hook from a wireless headset, or other element. In other embodiments, the second tubular element may be substantially straight. In some embodiments the apparatus may be made of a flexible material to receive eyewear and/or headsets of various shapes and sizes.

Figure 5:
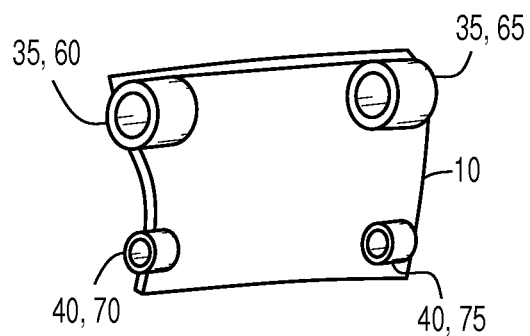
FIG. 5 is a side view illustrating another example apparatus for securing a wireless headset to a temple of a piece of eyewear in accordance with the present disclosure.

FIG. 5 illustrates an example embodiment wherein an apparatus 10 may include a first tubular element 35 having a first tubular portion 60 and second tubular portion 65 and wherein the second tubular element 40 includes a third tubular portion 70 and a fourth tubular portion 75. FIG. 5 also illustrates an example embodiment wherein one or both of the first tubular element 35 and the second tubular element 40 may be discontinuous. FIG. 5 also illustrates an example embodiment wherein one or both of the first tubular element 35 and the second tubular element 40 may be two or more spaced apart tubular portions.

In some example embodiments the apparatus may be made from a plastic, or plastic type, material. In some example embodiments the apparatus may be made from an elastomeric, or elastic, material. In some example embodiments the apparatus may be made from rubber, or a rubberized material.

Figure 6A:
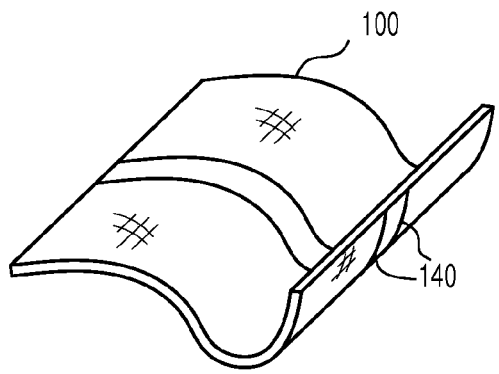
FIGS. 6A, 6B, and 6C illustrate steps that may be used to produce an example apparatus for securing a wireless headset to a temple of a piece of eyewear accordance with present disclosure.
Figure 6B:
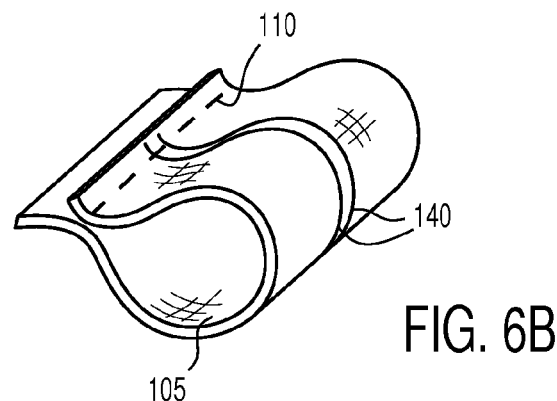
Figure 6C:
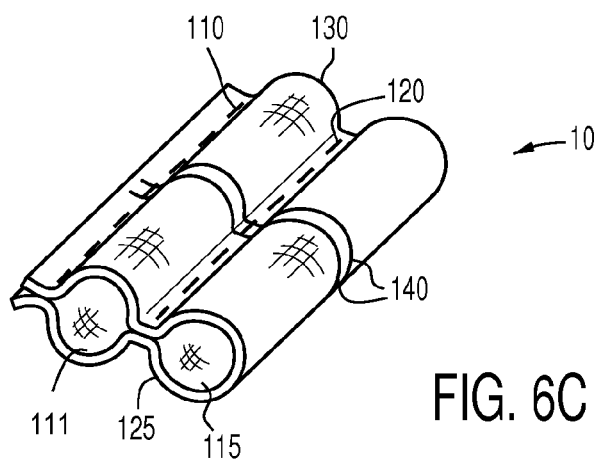

FIGS. 6A, 6B, and 6C illustrate steps that may be used to produce a product 10 in accordance with various embodiments. The product 10 may be configured to couple a wireless headset 15 to eyewear 30. The product 10 may be formed by the process comprising:

sewing a fabric 100 into a first loop 105 with a first seam 110;

bisecting the first loop 105 into a second 111 and third loop 115 by sewing a second seam 120 to fix opposite sides 125, 130 of the first loop 105 together, the second loop may be configured to receive a temple piece of the eyewear 30, and the third loop 115 may be configured to receive an elongate element coupled with an wireless headset 15, or configured with, for example, coupled with or formed with the wireless headset 15. The bisecting may, or may not form the second loop 111 and the third loop 115 into equal sized loops.

In various embodiments the fabric may be one or more fabrics selected from the group consisting of leather, vinyl, cotton, and plastic. In other embodiments various other materials, or combinations of materials, may be used.

Various embodiments may provide a device 10 which may include a single fabric 100 having a first seam 110 to form the fabric 100 into a continuous loop 105 and having a second seam 120 to form the fabric 100 into a first tubular element 35 and a second tubular element 40. The first tubular element 35 may be configured to be slipped over, or receive, the eyeglass temple piece, and the second tubular element 40 may be configured to be slipped over, or receive, an elongate element 20 coupled with a wireless headset 15 ear piece 17. In various embodiments the fabric 100 may include rubber or rubberized threads 140. The fabric may include elastic or elasticized threads 140. In this way the apparatus 10 may be able to receive, or be fitted on temples 25, and/or ear hooks 20 of various sizes.

The fabric 100 may include threads 140 to provide traction between the fabric 100 and one or both of the temple piece and the wireless headset 15 earpiece 17. In this way the apparatus 10 may resist slipping relative to the temple 25, and/or ear hook 20.

Some embodiments may include additional segments added to the fabric, or in some cases added to the apparatus 10 configured in ways not including a fabric. The segments may be configured to provide traction between the apparatus 10 and the temple 25 and/or ear hook 20. The segments may be for example patches of a traction material such as rubber, or the like. The segments may be sewn to, or adhered to the fabric.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. An apparatus to facilitate wearing eyewear and a wireless headset at the same time, the apparatus comprising:
   a first tubular element configured to be slipped over a temple of the eyewear; and
   a second tubular element configured to receive an around the ear securing element coupled with, or included with, the wireless headset;
   wherein the first tubular element includes first and second tubular portions, and wherein the second tubular element includes third and fourth tubular portions.

2. The apparatus of claim 1, wherein one or both pairs of the first and second tubular portions or the third and fourth tubular portions are spaced apart tubular portions.

3. An apparatus comprising:
   a single fabric having a first seam to form the fabric into a continuous loop, and having a second seam to form the fabric into a first tubular element and a second tubular element, the first tubular element configured to be slipped over the eyewear temple, and the second tubular element configured to receive an elongate element fixed to a wireless headset ear piece.

4. The apparatus of claim 3, wherein the fabric includes rubber or rubberized threads.

5. The apparatus of claim 3, wherein the fabric includes elastic or elasticized threads.

6. The apparatus of claim 3, wherein the fabric includes threads to provide traction between the fabric and one or both of the eyewear temples and the elongate element.

7. The apparatus of claim 3, wherein the fabric includes additional segments to provide traction between the fabric and one or both of the eyewear temples and the elongate element.

8. The apparatus of claim 7, wherein the portions are sewn to, or adhered to, the fabric.

9. A product to couple a wireless headset to eyewear, the product formed by the process comprising:
   sewing a fabric into a first loop with a first seam; and
   bisecting the first loop into a second and third loop by sewing the fabric with a second seam to fix opposite sides of the first loop together, the second loop configured to receive a temple piece of the eyewear, and the third loop configured to receive an elongate element configured with the wireless headset.

10. The product of claim 9 wherein the fabric is one selected from the group consisting of:
   leather; vinyl; cotton; and plastic.

\* \* \* \* \*